US010308047B1

(12) United States Patent
Wang et al.

(10) Patent No.: US 10,308,047 B1
(45) Date of Patent: Jun. 4, 2019

(54) PRINTER AND METHOD OF LOADING PAPERS INTO PRINTER TRAY

(71) Applicant: KYOCERA Document Solutions Inc., Chuo-ku, Osaka (JP)

(72) Inventors: Hui Wang, Temple City, CA (US); Neil-Paul Payoyo Bermundo, Glendora, CA (US); Philip Ver Paloma Dabon, Torrance, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/100,340

(22) Filed: Aug. 10, 2018

(51) Int. Cl.
G06F 3/12 (2006.01)
B41J 11/00 (2006.01)
B64C 39/02 (2006.01)
B41J 13/10 (2006.01)
G06K 15/02 (2006.01)
H04N 1/00 (2006.01)
B64D 1/08 (2006.01)

(52) U.S. Cl.
CPC ......... B41J 11/0075 (2013.01); B41J 13/103 (2013.01); B64C 39/024 (2013.01); B64D 1/08 (2013.01); G06K 15/02 (2013.01); H04N 1/0032 (2013.01); H04N 1/00334 (2013.01); B64C 2201/128 (2013.01)

(58) Field of Classification Search
CPC ... B41J 11/0075; B41J 13/103; B64C 39/024; B64C 2201/128; B64D 1/08; G06K 15/02; H04N 1/0032; H04N 1/00334
See application file for complete search history.

(56) References Cited

U.S. PATENT DOCUMENTS

| 2002/0054322 | A1* | 5/2002 | Geelen | G06F 3/1207 358/1.15 |
| 2013/0271785 | A1* | 10/2013 | Sakata | G06K 15/4065 358/1.15 |
| 2014/0023383 | A1* | 1/2014 | Kogusuri | G03G 15/553 399/8 |
| 2015/0266577 | A1* | 9/2015 | Jones | G05D 1/102 701/3 |
| 2015/0294200 | A1* | 10/2015 | Ito | G06K 15/1809 358/1.15 |

* cited by examiner

*Primary Examiner* — Moustapha Diaby
(74) *Attorney, Agent, or Firm* — Rimon PC; Marc S. Kaufman

(57) ABSTRACT

The present disclosure relates to a printer and a method of loading one or more papers into printer tray. In an aspect, the proposed printer can include a printer tray configured to hold a plurality of papers to be used for printing; and a paper sensor configured to sense when number of papers in the printer tray is below a defined threshold, such that when the number of papers in the printer tray is below the defined threshold, the paper sensor issues a notification message to a drone that in turn is configured to, based on the received notification message, pick up and carry one or more papers from a paper storage shelf and load the picked up one or more papers into the printer tray.

28 Claims, 6 Drawing Sheets

PRINTER AND METHOD OF LOADING PAPERS INTO PRINTER TRAY

TECHNICAL FIELD

The present disclosure relates to a printer and a method of loading one or more papers into printer tray.

BACKGROUND

Existing printers, upon running out of papers that are required for printing, stop printing and post a message such as "Load paper in Tray X". Such running out of paper and abrupt stoppage of printing terminates the printing job, and subsequently requires human effort to open the printer tray and load paper. Manual loading or abrupt stopping of the printer during operation may also cause printer driver stack overflow without immediate processing. Such a situation takes place because printer administrator may not at all times realize the number of papers currently in printer tray and/or number of papers required for pipelined print jobs, and hence may not be able to at all times ensure that the printer tray never runs out of paper.

There is therefore a need in the art for a printer and a method of loading one or more papers into printer tray that ensures that there are papers in the printer tray at all times.

SUMMARY

The present disclosure relates to a printer and a method of loading one or more papers into printer tray. In an aspect, the proposed printer can include a printer tray configured to hold a plurality of papers to be used for printing; and a paper sensor configured to sense when number of papers in the printer tray is below a defined threshold, such that when the number of papers in the printer tray is below the defined threshold, the paper sensor issues a notification message to a drone that in turn is configured to, based on the received notification message, pick up and carry one or more papers from a paper storage shelf and load the picked up one or more papers into the printer tray.

In an aspect, the present disclosure further relates to a method for loading one or more papers into a printer tray of a printer, wherein the method can include the steps of sensing, through a paper sensor configured in the printer, when number of papers in the printer tray is below a defined threshold; issuing, using the paper sensor, a notification message to a drone when the number of papers in the printer tray is below the defined threshold; and enabling the drone to, based on the received notification message, pick up and carry one or more papers from a paper storage shelf, and load the picked up one or more papers into the printer tray.

DETAILED DESCRIPTION

Figure 1:
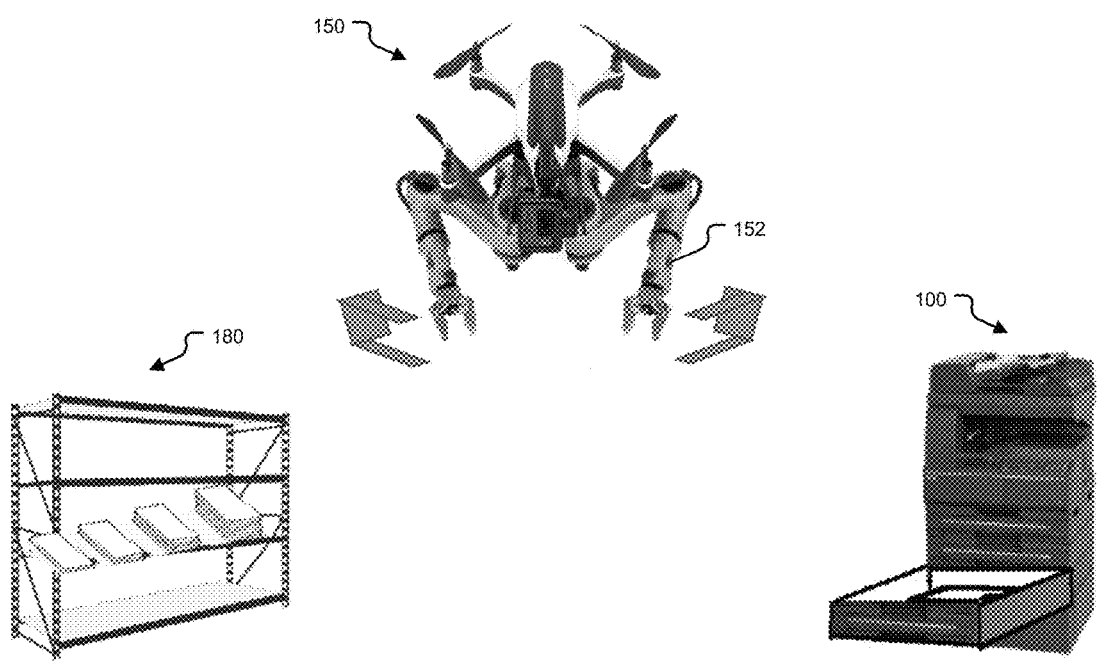
FIG. 1 illustrates an exemplary representation of proposed architecture in accordance with an embodiment of the present disclosure.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

The present disclosure relates to a printer and a method of loading one or more papers into printer tray. In an aspect, the proposed printer can include a printer tray configured to hold a plurality of papers to be used for printing; and a paper sensor configured to sense when number of papers in the printer tray is below a defined threshold, such that when the number of papers in the printer tray is below the defined threshold, the paper sensor issues a notification message to a drone that in turn is configured to, based on the received notification message, pick up and carry one or more papers from a paper storage shelf and load the picked up one or more papers into the printer tray.

In an aspect, the drone can be configured to sense the location of printer tray through a tray location sensor configured in the printer.

In another aspect, the notification message can indicate paper size to be loaded, based on which the drone can detect and pick up the one or more papers of the indicated paper size. Alternatively, the drone can detect and pick up a stack of paper as high as or as thick as the height that is needed to be filled in the paper tray. Such paper size can be indicated through a barcode that can be read by the drone to detect which of one or more stacks of papers present on the paper storage shelf corresponds to the indicated paper size. In yet another aspect, the notification message can indicate number of papers to be loaded on to the printer tray based on which the drone detects and picks up the one or more papers. Furthermore, in another aspect, the notification message can indicate height of the printer tray, based on which the drone detects and picks up the one or more papers.

In an aspect, the paper sensor can be configured to detect arrival of the drone, and eject the printer tray for loading of the one or more papers based on such detection.

In another aspect, the drone can include a flying management module configured to enable the drone to perform any or a combination of flying, aerial maneuvering, charging, reloading of tools, and homing.

In another aspect, the drone can include any or a combination of a gyro sensor, a GPS sensor, an altitude sensor, and a focusing laser. The drone can further, in an aspect, include a plurality of arms to pick up and carry the one or more papers. In another aspect, the drone can include a camera to detect an appropriate stack on the paper storage shelf from which the one or more papers are to be picked up.

In an aspect, the camera can be further used for any or a combination of locating the printer, locating printer tray of the printer, determining paper size, and counting the one or more papers.

In an aspect, the drone can include a barcode reader that can be configured to read barcodes printed on a plurality of stack of papers, and detect at least one desired stack for picking up the one or more papers based on the read barcode information.

In an aspect, the printer can further include a tray location sensor configured to communicate with and enable the drone to find the location of the printer tray.

In an aspect, the notification message can include any or a combination of type of paper to be loaded, size of paper to be loaded, number of papers to be loaded, height of the printer tray, and paper stack height.

In another aspect, the printer can further include a tray control sensor that can be configured to automatically control ejection and closing of the printer tray based on arrival or departure of the drone. In yet another aspect, the loaded one or more papers can be aligned before the printer tray is closed.

In an aspect, the printer can be configured to issue an audio notification or a visual notification on the printer display before ejection of the printer tray.

In an aspect, the present disclosure further relates to a method for loading one or more papers into a printer tray of a printer, wherein the method can include the steps of sensing, through a paper sensor configured in said printer, when number of papers in said printer tray is below a defined threshold; issuing, using said paper sensor, a notification message to a drone when the number of papers in said printer tray is below the defined threshold; and enabling the drone to, based on said received notification message, pick up and carry one or more papers from a paper storage shelf, and load the picked up one or more papers into the printer tray.

FIG. 1 illustrates an exemplary representation of proposed architecture in accordance with an embodiment of the present disclosure. As shown, exemplary implementation of the present disclosure can be conducted through communication between a paper sensor (102 of FIG. 2) configured in a printer 100 and a drone 150 (also interchangeably referred to as drone paper carrier 150), wherein the paper sensor can issue, through a suitable notification or message, intimation to the drone 150 when the number of papers in the printer tray (not shown) is less than a defined threshold (say less than 30). Based on such a message/notification, drone 150 can initiate its movement, and maneuver its way to a paper storage shelf 180 that carries one or more stacks of papers of same or varying sizes (such as A3 or A4). Once the drone 150 reaches the storage shelf 180, it picks up a defined number of papers from a suitable stack, and drops it into the tray of the printer 100. As would be appreciated, notification sent from the paper sensor of the printer 100 can include information pertaining to, for instance, any or a combination of number of papers required, height of the printer tray, size/type of paper required (A3 or A4), among other parameters, based on which the drone can select the one or more papers from a suitable stack of the storage shelf 180, and deliver it into the tray of the printer 100.

In another aspect of the present disclosure, an automatic printer paper feeding system is disclosed, wherein the system can include a paper storage shelf 180, a drone paper carrier 150, and a sensor based printer 100. In implementation, when paper sensor configured in the printer 100 finds that the paper amount (number of papers remaining in the printer tray) is less than a certain threshold, it can send a message to notify the drone paper carrier 200 to load paper. The drone paper carrier 150 can then sense location of the paper shelf 100, and find an appropriate paper size stack in the paper shelf 180 so as to pick up the paper and carry it to the printer 100. When the printer sensor notices the arrival of drone paper carrier 150, the paper/printer tray can be ejected automatically, based on which the drone paper carrier 150 can drop the paper into the tray/cassette. After the paper sensor receives the complete message, the printer tray can be closed and the printing can be resumed.

In an aspect, the drone 150 can be configured to sense the location of paper tray through a tray location sensor configured in the printer 100.

In another aspect, the notification message (from the printer to the drone) can indicate paper size/type to be loaded, based on which the drone 150 can detect and pick up the one or more papers of the indicated paper size. In an exemplary implementation, such paper size can be indicated through a barcode and/or QR code that can be read by the drone 150 to detect which of the one or more available stacks of papers present on the paper storage shelf corresponds to the indicated paper size. For instance, barcode BC1 for A4 size paper would be different from barcode BC2 for A3 size papers, and hence, when the drone 150 receives the message/notification from the paper sensor; as part of the message, it receives the barcode indicative of which paper type/size is to be picked up, and accordingly reads, using a barcode reader configured therein, barcode of one or more paper stacks on the shelf 180 such that sooner it matches the barcode received as part of the message with barcode printed on a stack, it picks up a defined number of papers from the stack and delivers to the printer tray.

In yet another aspect, the notification message can indicate number of papers to be loaded on to the printer tray based on which the drone detects and picks up the one or more papers. For instance, the paper sensor can mention that 150 papers are required to be picked up from the paper shelf and placed in the tray. Alternatively, in another exemplary aspect, the notification message can indicate height of said printer tray, based on which the drone can detect and pick up the one or more papers. In such a case, the drone 150 can automatically determine the number of papers that would be required to fill up the printer tray of the printer 100. Many other additional embodiments can be configured, all of which are well within the scope of the present disclosure, and the present invention is not limited by the above embodiments in any manner whatsoever. For instance, notification/message from the paper sensor can include printer model number, based on which the drone can automatically determine number of papers that are required to fill the printer's paper tray to its capacity and accordingly pick up the one or more papers.

In an aspect, the paper sensor can be configured to detect arrival of the drone 200, and eject the printer tray for loading of the one or more papers based on such detection.

In another aspect, the drone 150 can include a flying management module configured to enable the drone 150 to perform any or a combination of flying, aerial maneuvering, charging, reloading of tools, and homing. The drone 150 can further include any or a combination of a gyro sensor, a GPS sensor, an altitude sensor, and a focusing laser for stability and efficient drive/maneuver of the drone 150. The drone 150 can further, in an aspect, include a plurality of arms 152 to pick up and carry the one or more papers. In another aspect, the drone can include a camera to detect an appropriate stack on the paper storage shelf 180 from which the one or more papers are to be picked up. Such a camera, in an aspect, can be further used for any or a combination of locating the printer, locating printer tray of the printer, determining paper size, and counting the one or more papers. In another embodiment, the drone 150 can include a barcode reader that can be configured to read barcodes printed on a plurality of stack of papers, and detect at least one desired stack for picking up said one or more papers based on said read barcode information.

In an aspect, the printer 100 can further include a tray location sensor (104 of FIG. 2) configured to communicate with and enable the drone 150 to find the location of the printer tray.

In an aspect, the notification message can include any or a combination of type of paper to be loaded, size of paper to be loaded, number of papers to be loaded, height of said printer tray, and paper stack height.

In another aspect, the printer 100 can further include a tray control sensor (106 of FIG. 2) that can be configured to automatically control ejection and closing of the printer tray based on arrival or departure of the drone. In yet another aspect, the loaded one or more papers can be aligned before the printer tray is closed.

In an aspect, the printer 100 can be configured to issue an audio notification or a visual notification on the printer display before ejection of the printer tray.

Figure 2A:
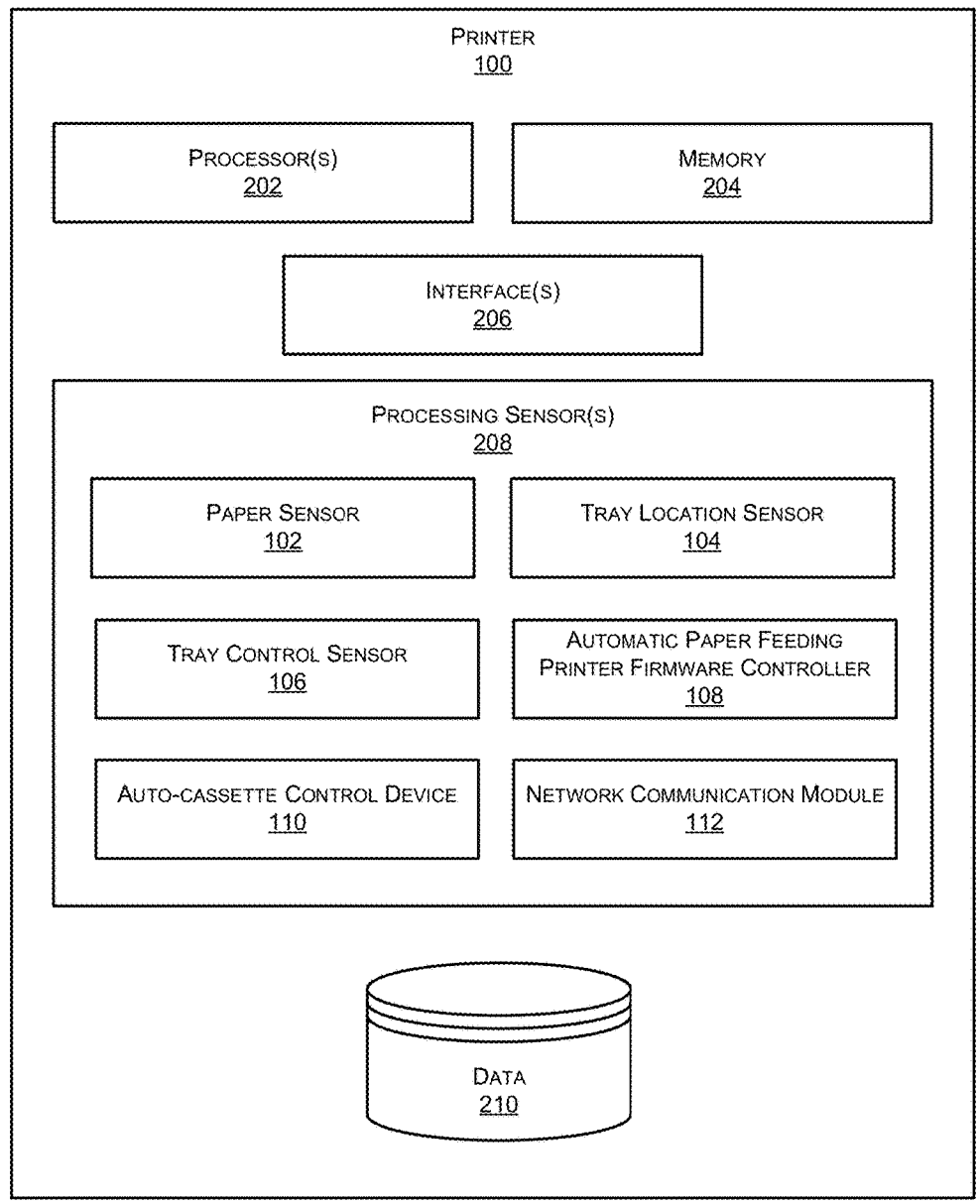
FIGS. 2A and 2B illustrate exemplary architectures of elements of the proposed system in accordance with an embodiment of the present disclosure.

FIG. 2A illustrates an exemplary internal architecture of the proposed printer in accordance with an embodiment of the present disclosure. As illustrated, printer 100 can include one or more processor(s) 202. The one or more processor(s) 202 can be implemented as one or more microprocessors, microcomputers, microcontrollers, digital signal processors, central processing units, logic circuitries, and/or any devices that manipulate data based on operational instructions. Among other capabilities, the one or more processor(s) 202 are configured to fetch and execute computer-readable instructions stored in a memory 204 of the printer 100. The memory 204 can store one or more computer-readable instructions or routines, which may be fetched and executed to create or share the data units over a network service. The memory 204 can include any non-transitory storage device including, for example, volatile memory such as RAM, or non-volatile memory such as EPROM, flash memory, and the like. In an example embodiment, the memory 204 may be a local memory or may be located remotely, such as a server, a file server, a data server, and the Cloud.

In an aspect, the printer 100 can also include an interface(s) 206. The interface(s) 206 may include a variety of interfaces, for example, interfaces to present printing status, number of papers left in printer tray, among other like information. Printer 100 can further include one or more processing sensors 208, including but not limited to, a paper sensor 102, a tray location sensor 104, and a tray control sensor 106. Said sensors can be implemented as a combination of hardware and software or firmware programming (for example, programmable instructions) to implement one or more functionalities of the printer 100. In examples described herein, such combinations of hardware and software or firmware programming may be implemented in several different ways. For example, the programming for the sensors may be processor executable instructions stored on a non-transitory machine-readable storage medium and the hardware for the sensors may include a processing resource (for example, one or more processors), to execute such instructions. In the examples, the machine-readable storage medium may store instructions that, when executed by the processing resource, implement the sensors 208. In such examples, the printer 100 can include the machine-readable storage medium storing the instructions and the processing resource to execute the instructions, or the machine-readable storage medium may be separate but accessible to the printer 100 and the processing resource. In other examples, the sensors 208 may be implemented by electronic circuitry. The data 210 can include data that is either stored or generated as a result of functionalities implemented by any of the components of the sensor(s) 208. For instance, the messages/notifications generated by the paper sensor 102 can be stored as part of the data 210, which can either be hosted within the memory of the printer 100 or in the cloud/external database. Any other implementation of how the data is stored/generated/managed is well within the scope of the present invention.

In an aspect, paper sensor 102, as mentioned above, can be configured to, in real-time, count the number of papers remaining in printer tray, such that sooner the number of papers is below a defined threshold (say less than 30), the paper sensor 102 can issue a notification/instruction/message to the drone paper carrier 150 to pick up one or more papers from a stack of papers located on a shelf 180 and place in the tray/cassette of the printer.

In an aspect, tray location sensor 104, on the other hand, can be configured to communicate with the drone 150 through any communication means including but not limited to Bluetooth, Wi-Fi, Internet, Zigbee, Near Field Communication (NFC) or any other wired/wireless communication means, and assist the drone 200 to locate the printer tray and place said one or more collected papers into the tray.

In another aspect, tray control sensor 106 can, upon arrival of the drone paper carrier 150 at the printer 100, receive a paper feeding message from the drone 150, and start action of ejecting the printer/paper tray, along with controlling the action of closing the tray after the drone 150 has finished loading the paper.

Figure 2B:
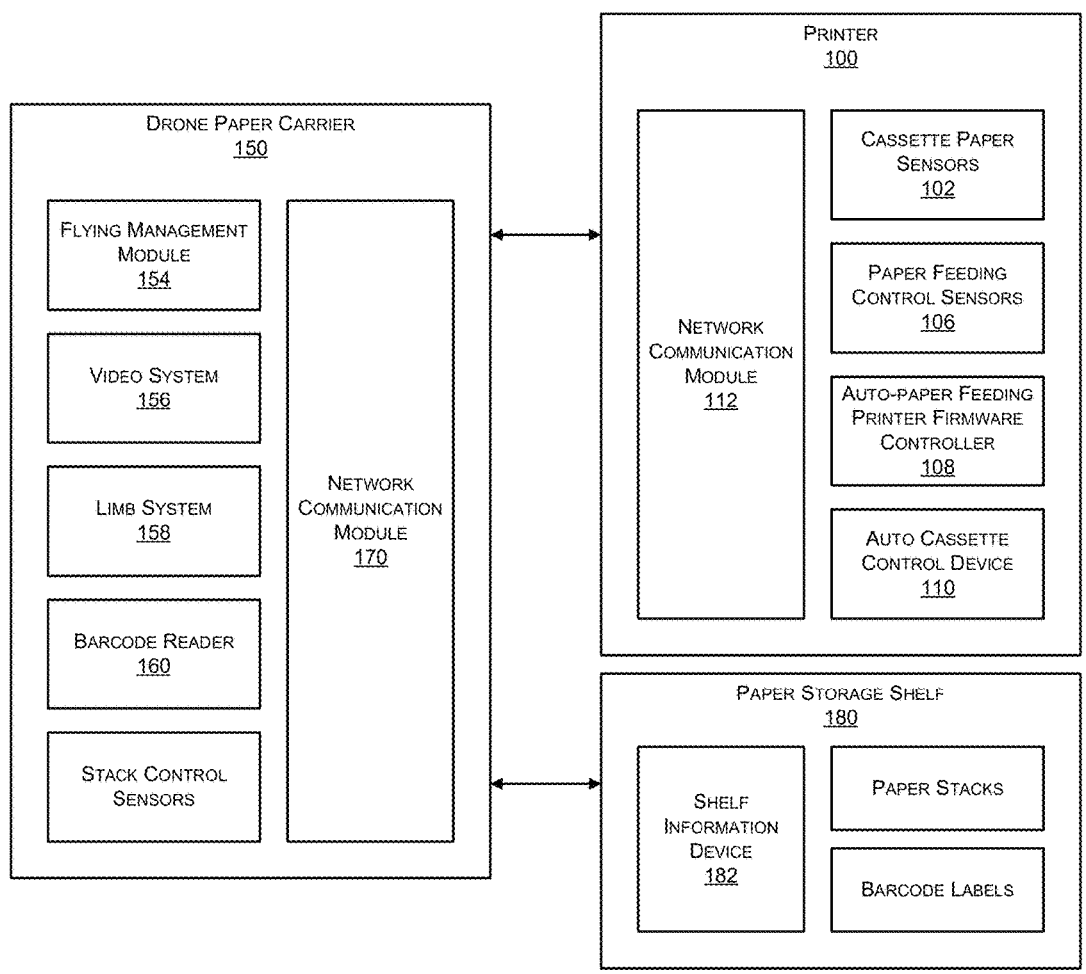

With reference to FIG. 2B, in an aspect, the present disclosure pertains to an automatic printer paper feeding system, wherein the system includes a paper storage shelf 180, a drone paper carrier 150, and an automatic paper feeding printer 100. In implementation, when one or more configured paper sensors 102 in the printer 100 detect that the paper amount is less than a certain threshold, they transmit a message/notification/signal to the drone paper carrier 150 to load paper. The drone paper carrier 150 senses the paper shelf location and finds the correct paper size stack in the paper shelf to fetch the paper and carries paper to the printer 100. When the printer 100 receives the arrival of drone paper carrier 150, it automatically opens the cassette. The drone paper carrier 150 drops the paper into the cassette. The paper feeding control sensors 106 control proper paper alignment and then issue a completion message to printer firmware to close cassette automatically, post which the printer 100 is ready for printing.

In another aspect, the proposed paper storage shelf 180 can be equipped with an information tacking device that can stack control sensors for stack height information for re-filling and re-ordering purpose. The proposed shelf can also, in an aspect, contain a communication module for communication with other devices such as drone paper carrier 150 or printer administrator PC. The proposed shelf 180 can maintain shelf identifier, storage paper types, and paper filling and fetching information. For example, the shelf 180 can communicate with drone paper carrier 150 and recode each drone paper carrier fetching information so that the printer administrator is able to control the storage from the records.

In an aspect, Flying Management Module (FMM) 154 of the present disclosure can be configured to take care of the overall flying motion of the device, which can help support flying, aerial manoeuvring and homing feature. These capabilities can allow power re-charging, re-loading of tools, among other actions. FMM 154 of the proposed drone printer can take advantage of existing technologies for flying and areal manoeuvring, but can also include technologies using gyro sensors, altitude sensors, and focusing lasers to add more stability when the Drone paper carrier begins to grab or load paper. It will also take advantage of availability of a limb system 158 so that the drone paper carrier 150 can be functional like human hands.

In an aspect, the proposed FMM 154 can include, but is not limited to GPS system for positioning in 3D-space, stabilizer such as Gyro and other sensors for accurate manoeuvring in 3D-space.

In an aspect, the proposed drone 150 of the present disclosure can include a limb system 158 that can include one or more robotic arms 152 that can grab/drop paper such that when the drone 150 arrives at the paper storage shelf 180, it lifts both left and right arms to pull the paper out with needed thickness of paper. In an exemplary implementation, the drone 150 can, based on shelf ID provided by paper storage shelf information device 182, barcode position using barcode reader 160, and image of video system 156, reach the target paper stack, based on which the drone printer carrier 150 lifts both arms to pull the paper in the correct position monitored by the video system 156. Paper feeding stack control sensor can then check the paper stack height to confirm the paper fetching process such that after the requested paper is lifted, drone 150 can be informed about the completion of pulling paper, based on which the drone 150 carries paper to the printer 100.

In an exemplary implementation, the paper feeding process can include one or more steps, wherein firstly, after approaching the printer 100, the drone 150 sends paper feeding start message to printer controller, post which after the target tray is opened, the drone adjusts its position based on image of video system 156 and becomes ready to drop paper into the tray. After the paper is dropped, the drone notifies printer the completion of the carrier task.

In an aspect, the proposed drone printer can include a barcode reader 160 that can help the drone printer carrier to confirm correct paper size. The barcode reader 160 can also work with video system 156 to determine the exact paper size stack location.

As mentioned above, the proposed drone printer 150 can include or be operatively coupled with a video system 156 having a camera (for instance) that can be used to support scanning and paper size stack detection. The video system 156 in the drone printer can scan paper storage shelf and paper size images. These images can be further used in paper size and location detection. In addition, when certain paper stack is less than certain amount of threshold, the drone 150 can notice administrator for ordering paper, wherein the video system 156 can provide image for printer administrator to control and monitor the paper feeing process.

In an exemplary implementation, the proposed drone printer 150 can include a paper feeding stack control sensor (not shown) that can monitor paper stack height while carrier is fetching the paper such that when the paper stack height matches with requested one, the control sensor notifies the carrier of an affirmative message. Otherwise, the carrier continues to fetch paper.

In another embodiment, the proposed drone printer can include or be operatively coupled with a network communication module 170 that provides communication support for controlling the drone paper carrier device. Various connectivities can be supported such as Wi-Fi. Bluetooth, and even Cellular signal for better coverage.

In an exemplary aspect, automatic paper feeding printer of the present disclosure can include, but are not limited to, one or more tray paper sensors 102, one or more paper feeding control sensors 106, an automatic paper feeding printer firmware controller 108, and an automatic eject/close tray, and a network communication module 112.

In an aspect, with respect to cassette tray paper sensor 102, it is to be appreciated that in regular printer, when printer engine detects paper out, the printer firmware stops printing and sends out paper out message in control panel or network message. The printer 100 user starts to feed paper and printer resumes printing. In the instant disclosure/invention, the tray paper sensor 102 (also referred to as cassette paper sensor) detects if paper size stack is less than certain threshold value, and then notifies printer firmware to send paper feeding request for paper size and requested paper stack height through the network communication module 112.

In an aspect, paper feeding control sensor 106 detects drop of paper position and issues a request of paper alignment in the tray. After paper is in correct position, the sensor can be configured to issue complete of paper feeding to firmware.

In another aspect, the proposed printer 100 can include an automatic cassette control device 110 that can be configured in or as part of a printer firmware, and communicate with the automatic cassette control device. It would be appreciated that cassette and tray, in the present disclosure, are being interchangeably used. The regular printer cassette opens and closes by man power, whereas the proposed application automatic cassette control device 110 has automatic eject and close functionality.

In an aspect, the automatic tray control device 100 can include, but is not limited to an electric unit, an electric motor, a beeping device, and a push/pull jack. The automatic tray/cassette control device 110 can be attached to the middle of the back of the fixed tray and the top of push/pull jack part can be fixed to detachable cassette.

In an aspect, an electric unit can provide electric power to the proposed printer such that when cassette ejection is requested, the beeping device starts to beep a few seconds before ejection, post which the electric motor starts to move the lift jack to push the cassette out.

In an aspect, the proposed jack can be designed to have multi-segments, each segment having a different size in order to be compressed to one segment when cassette is close. The cassette has two tracks in the both sides so that when the jack pushes the cassette, it can eject smoothly. After cassette is completely ejected, the beeping stops and tray is waiting for paper feeding. After paper feeding is completed, the automatic cassette/tray control device 110 receives close cassette message. The electric motor drives the jack back and drags the cassette back to tray holder and cassette is closed.

In an aspect, the proposed printer can include an automatic paper feeding printer firmware controller 108, which upon receiving the paper out message from cassette paper sensor 102, sends a paper feeding request to drone paper carrier 150 with paper size, type and height. If paper fetching from paper storage shelf fails, printer firmware receives error message from drone and posts an automatic paper feeding error and waits for printer user action. On the other hand, if the paper fetching is successful, the printer firmware waits for paper feeding start message from the drone, which happens after drone paper carrier 150 approaches the printer 100.

Upon receiving paper feeding start message, the printer firmware checks if target tray is in use, which if yes, pauses printing. If no, it issues beeping (warning voice) before tray ejection to avoid harming people at the printer. After the beeping, the firmware issues auto tray ejection message to auto-cassette control device 110. After paper cassette is ejected, firmware issues ready to feed message to the drone. The drone starts to drop paper into the tray/cassette, the printer firmware may get paper alignment request from paper feeding control sensor 106 (also referred to as tray or cassette control sensor). After all action of paper feeding is completed, the paper feeding control sensor 106 issues a completion message and the automatic cassette control device 110 starts to automatically close the cassette. After the tray is closed, and cassette paper sensor 102 notifies printer firmware and printer 100 is ready to print.

In an aspect, it would be appreciated that printer 100 of the present disclosure can be of any make, size, and construction. The printer can also be a printer-cum-scanner, or a multi-functional printer of any configuration. It would further be appreciated that communication between the sensors(s) of the printer 100 and the drone 150 can be through any wired/wireless mechanism, and exemplary implementations, as described above, do not limit the scope of the invention in any manner whatsoever.

It would further be appreciated that after the papers are loaded by the drone 150, the printer 100 can adjust/align the loaded papers before closing the printer tray.

Figure 3:
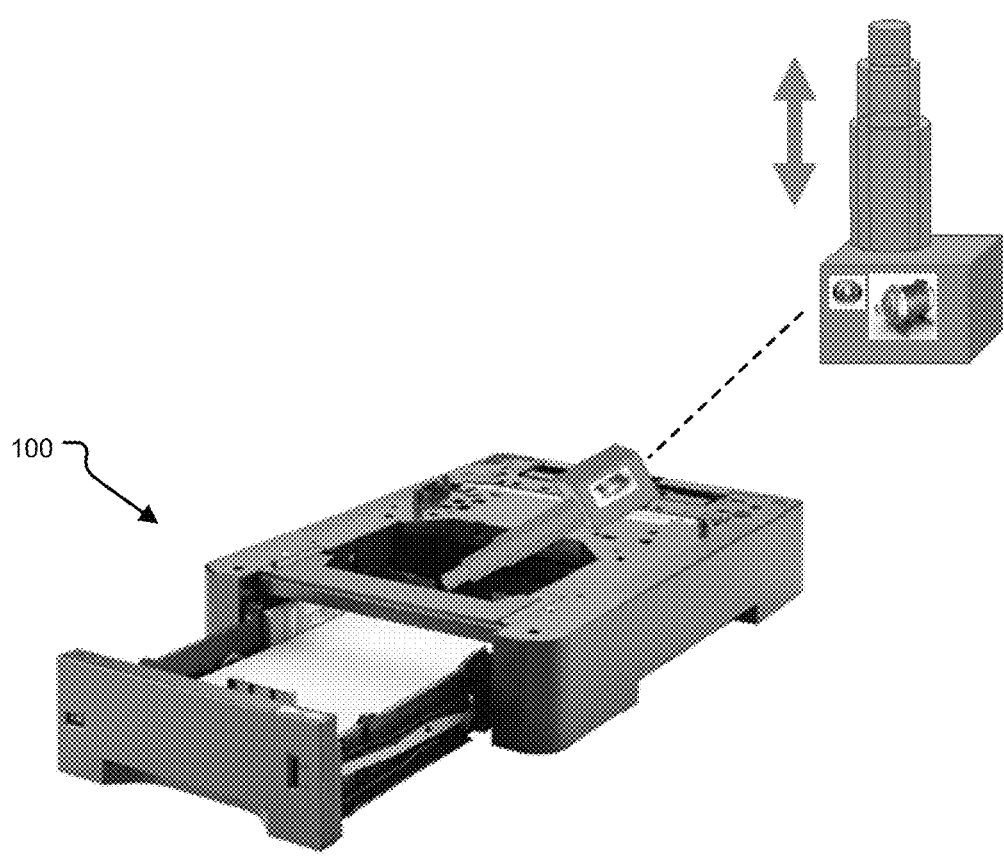
FIG. 3 illustrates an exemplary operation of automatic cassette control device that automatically opens and closes cassette/tray of printer upon detection of the drone in accordance with an embodiment of the present disclosure.

FIG. 3 illustrates an exemplary operation of automatic cassette control device 110 that automatically opens and closes the cassette/tray of the printer 100 upon detection of the drone 150 as explained above.

Figure 4A:
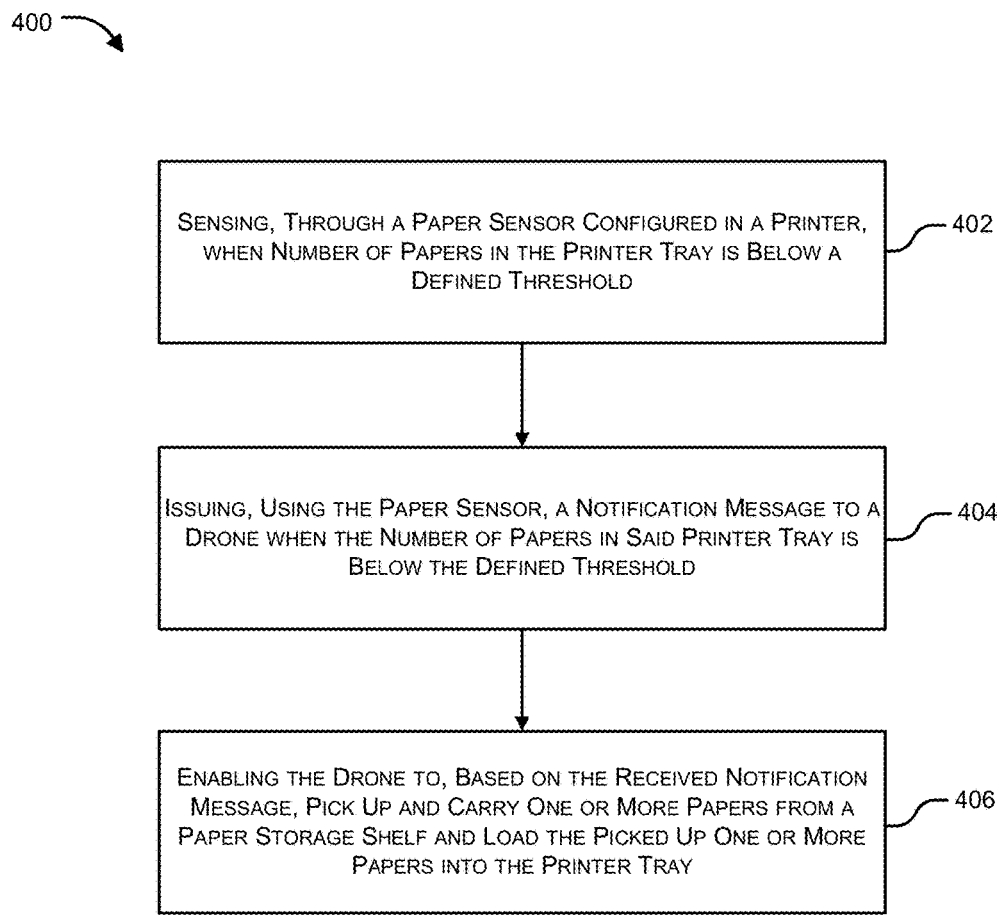
FIGS. 4A and 4B illustrate exemplary flow diagrams for loading one or more papers into a printer tray of a printer.

FIG. 4A illustrates an exemplary flow diagram 400 for loading one or more papers into a printer tray of a printer. In an aspect, the method 400 can include the steps of, at step 402, sensing, through a paper sensor configured in the printer, when number of papers in said printer tray is below a defined threshold; at step 404, issuing, using said paper sensor, a notification message to a drone when the number of papers in said printer tray is below the defined threshold; and, at step 406, enabling said drone to, based on said received notification message, pick up and carry one or more papers from a paper storage shelf, and load said picked up one or more papers into said printer tray.

Figure 4B:
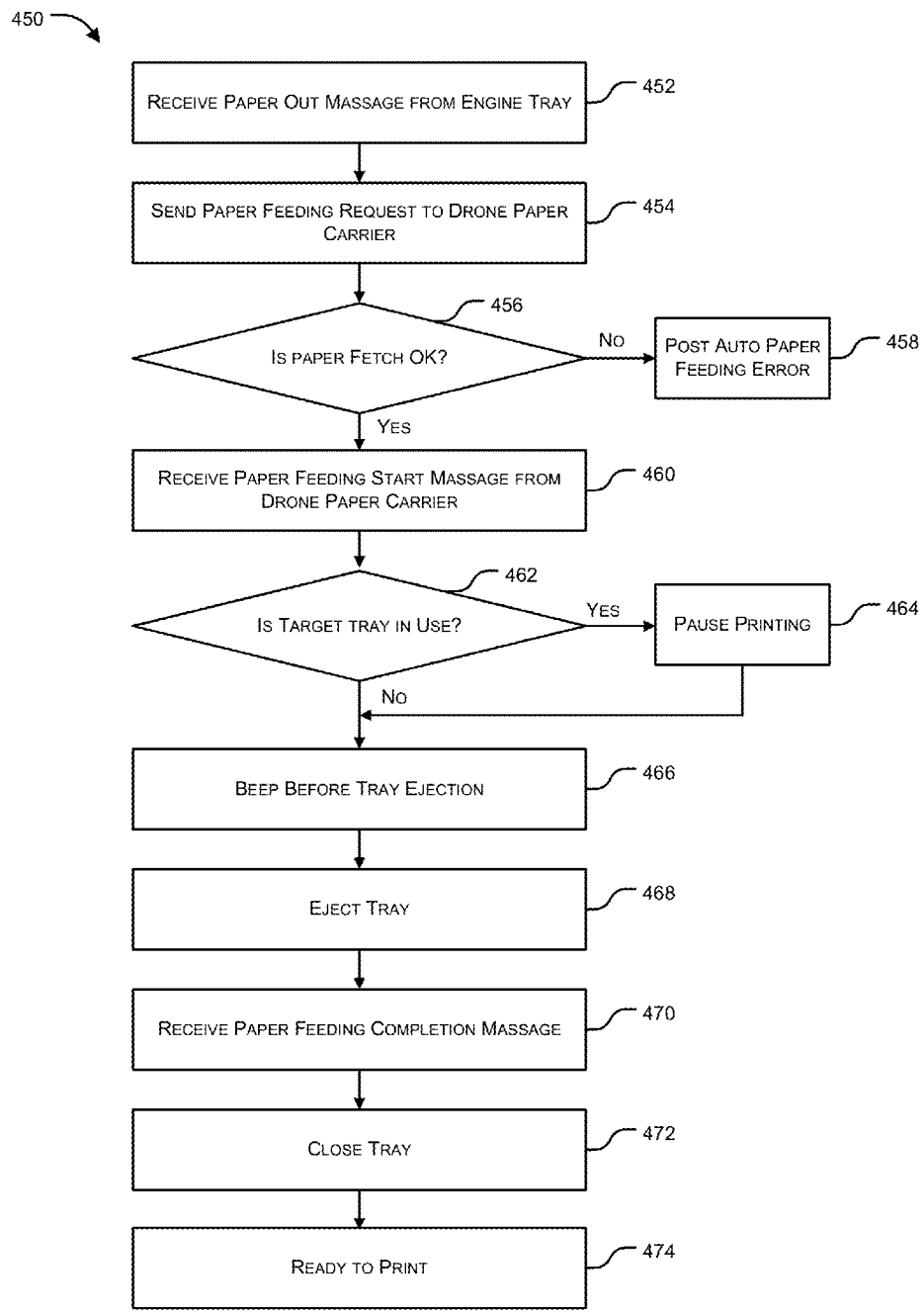

FIG. 4B illustrates another exemplary method 450 showing working of the proposed system in accordance with an embodiment of the present disclosure. At step 452, the printer 100 receives a paper out message from the paper sensor 102/engine tray, based on which, at step 454, the printer (or printer sensor 102) sends paper feeding request to drone paper carrier. At step 456, it is checked if the paper has been fetched properly, based on which, if the paper has not been fetched properly, an error message can be given at step 458, else, at step 460, the drone printer carrier receives a paper feeding start notification/message from the printer 100. At step 462, it is checked if the target tray is in use, wherein if the target tray is in use, at step 464, printing can be paused, else at step 466, a beep signal can be transmitted before tray ejection. At step 468, the tray is ejected, and at step 470, a feeding completion message is transmitted by the printer, based on which at step 472-474, the tray is closed and the printer is ready to print.

It would be appreciated that although the present disclosure is being described with respect to a printer, any other device that requires paper sheets to be fed such as a plotter, a copier, a facsimile machine, or any other apparatus is well within the scope of the present disclosure, and should be interpreted to be included in the term printer.

The present invention has been described herein with reference to a particular embodiment for a particular application. Those having ordinary skill in the art and access to the present teachings will recognize additional modifications applications and embodiments within the scope thereof. It is therefore intended by the appended claims to cover any and all such applications, modifications and embodiments within the scope of the present invention.

Moreover, other implementations of the present application will be apparent to those skilled in the art from consideration of the specification and practices of the example implementations disclosed herein. Various aspects and/or components of the described example implementations may be used singly or in any combination. It is intended that the specification and examples be considered as examples, with a true scope and spirit of the application being indicated by the following claims.

The invention claimed is:

1. A printer comprising:
a printer tray configured to hold a plurality of papers to be used for printing; and
a paper sensor configured to sense when number of papers in said printer tray is below a defined threshold, such that when the number of papers in said printer tray is below the defined threshold, the paper sensor issues a notification message to a drone that in turn is configured to, based on said received notification message, pick up and carry one or more papers from a paper storage shelf and load said picked up one or more papers into said printer tray.

2. The printer of claim 1, wherein said drone senses said location of printer tray through a tray location sensor that is configured in the printer.

3. The printer of claim 1, wherein said notification message indicates paper size to be loaded, based on which said drone detects and picks up said one or more papers of said indicated paper size.

4. The printer of claim 3, wherein said paper size is indicated through a barcode that is read by said drone to detect which of one or more stacks of papers present on the paper storage shelf corresponds to the indicated paper size.

5. The printer of claim 1, wherein said notification message indicates number of papers to be loaded on to said printer tray based on which said drone detects and picks up said one or more papers.

6. The printer of claim 1, wherein said notification message indicates height of said printer tray, based on which said drone detects and picks up said one or more papers.

7. The printer of claim 1, wherein said paper sensor detects arrival of said drone, and ejects said printer tray for loading of said one or more papers based on such detection.

8. The printer of claim 1, wherein said drone comprises a flying management module (FMM) configured to enable said drone to perform any or a combination of flying, aerial maneuvering, charging, reloading of tools, and homing.

9. The printer of claim 1, wherein said drone comprises of any or a combination of a gyro sensor, a GPS sensor, an altitude sensor, and a focusing laser.

10. The printer of claim 1, wherein said drone comprises of a plurality of arms to pick up and carry said one or more papers.

11. The printer of claim 1, wherein said drone comprises a camera to detect an appropriate stack on said paper storage shelf from which said one or more papers are to be picked up.

12. The printer of claim 11, wherein said camera is further used for any or a combination of locating said printer, locating printer tray of said printer, determining paper size, and counting said one or more papers.

13. The printer of claim 1, wherein said drone comprises a barcode reader that is configured to read barcodes printed on a plurality of stack of papers, and detect at least one desired stack for picking up said one or more papers based on said read barcode information.

14. The printer of claim 1, wherein said printer further comprises a tray location sensor configured to communicate with and enable said drone to find said location of said printer tray.

15. The printer of claim 1, wherein said notification message comprises any or a combination of type of paper to be loaded, size of paper to be loaded, number of papers to be loaded, height of said printer tray, and paper stack height.

16. The printer of claim 1, wherein said printer further comprises a tray control sensor configured to automatically control ejection and closing of said printer tray based on arrival or departure of said drone.

17. The printer of claim 16, wherein said loaded one or more papers are aligned before said printer tray is closed.

18. The printer of claim 1, wherein said printer issues an audio notification or a visual notification on the printer display before ejection of said printer tray.

19. The printer of claim 1, wherein the paper storage shelf comprises an information tracking device for determining paper stack height on the shelf and re-order when the height is lesser than a second defined threshold.

20. The printer of claim 1, wherein the paper storage shelf comprises information pertaining to any or a combination of a shelf identifier, storage paper types, and paper filling and fetching information.

21. The printer of claim 1, wherein the drone comprises a limb system that further comprises one or more robotic arms that grab/drop paper such that when the drone arrives at the paper storage shelf, said drone lifts both left and right arms to pull the paper out with needed thickness of paper.

22. The printer of claim 21, wherein the drone determines position of desired paper stack on the shelf using a barcode reader, and lifts both arms to pull the paper in a correct position monitored by a video system, wherein a paper feeding stack control sensor that is configured in the drone checks the paper stack height to confirm execution of paper fetching process such that after the paper is lifted, said drone is informed about a completion of the pulling paper, based on which said drone carries the paper to the printer.

23. The printer of claim 1, wherein the printer further comprises an automatic cassette control device configured in or as part of a printer firmware, and configured to automatically eject and close printer tray to receive the paper.

24. A drone configured to receive a notification message from a printer, said printer comprising a printer tray configured to hold a plurality of papers to be used for printing; and a paper sensor configured to sense when number of papers in said printer tray is below a defined threshold, such that when the number of papers in said printer tray is below the defined threshold, the paper sensor issues said notification message to said drone, said drone being in turn configured to, based on said received notification message, pick up and carry one or more papers from a paper storage shelf and load said picked up one or more papers into said printer tray.

25. A method for loading one or more papers into a printer tray of a printer, said method comprising the steps of:
sensing, through a paper sensor configured in said printer, when number of papers in said printer tray is below a defined threshold;
issuing, using said paper sensor, a notification message to a drone when the number of papers in said printer tray is below the defined threshold;
enabling said drone to, based on said received notification message, pick up and carry one or more papers from a paper storage shelf, and load said picked up one or more papers into said printer tray.

26. The method of claim 25, wherein said notification message indicates paper size to be loaded, based on which said drone detects and picks up said one or more papers of said indicated paper size.

27. The method of claim 25, wherein said notification message indicates number of papers to be loaded on to said printer tray based on which said drone detects and picks up said one or more papers.

28. The method of claim 25, wherein said notification message indicates height of said printer tray, based on which said drone detects and picks up said one or more papers.

* * * * *